Nov. 28, 1967   L. C. WRIGHT   3,355,121
EXPANSIBLE CHUCK FOR TUBULAR CORE
Filed Oct. 13, 1966   2 Sheets-Sheet 1
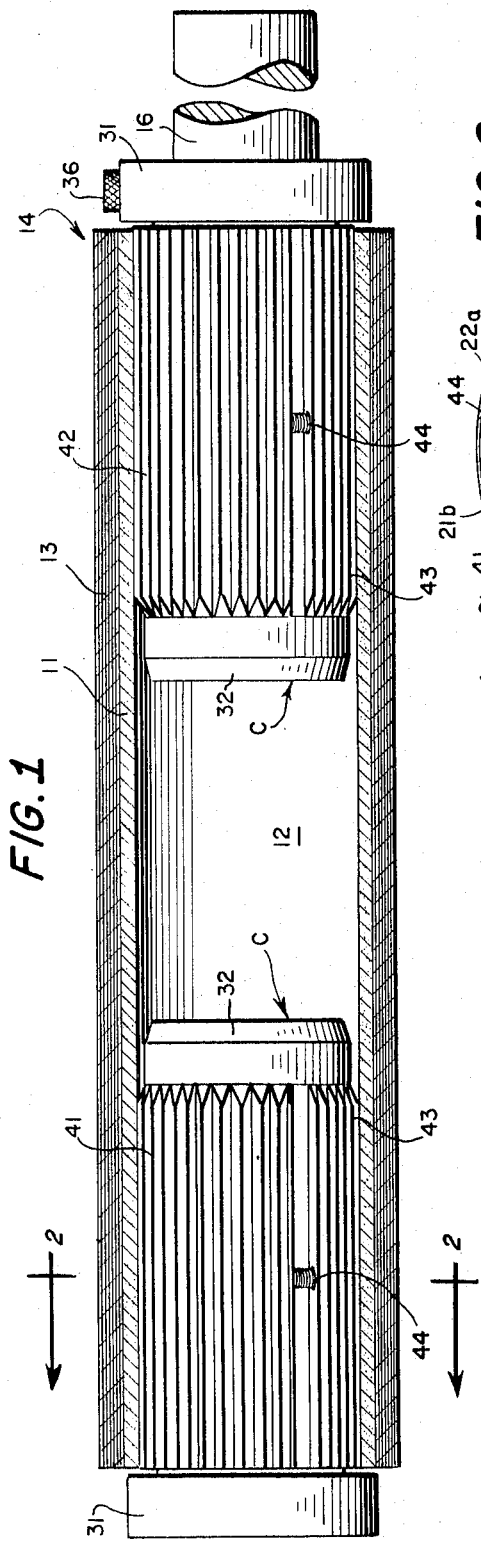
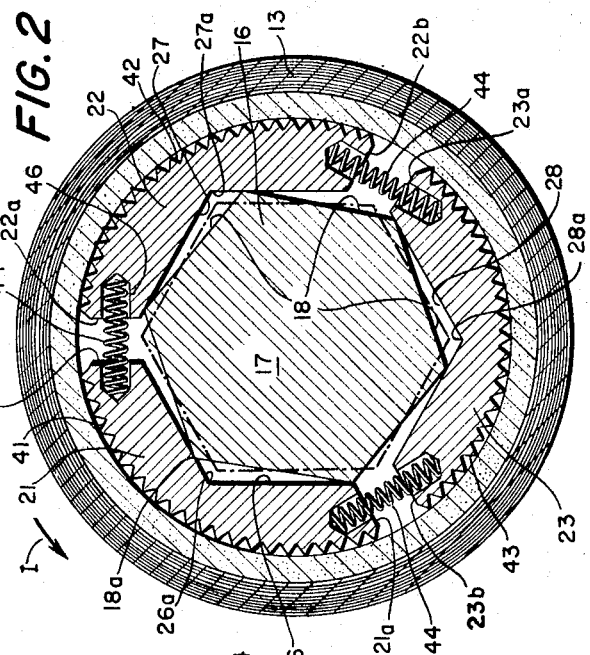
INVENTOR.
LEON C. WRIGHT
BY
*L. Russell Foster*
ATTORNEY

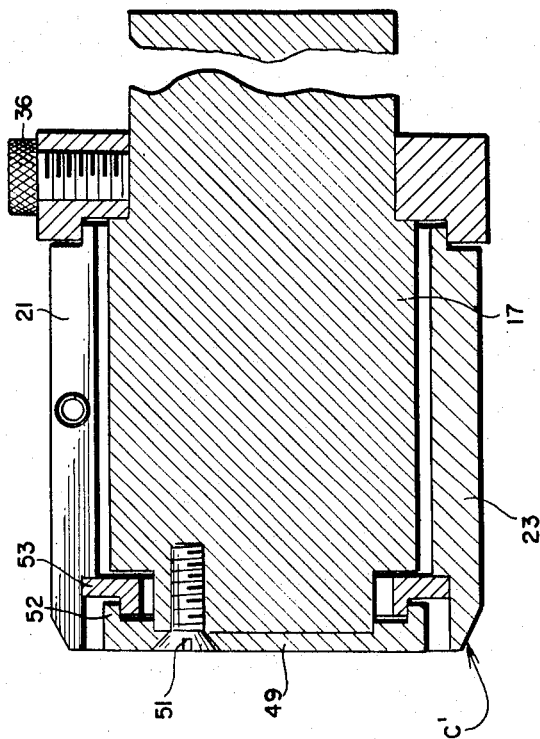
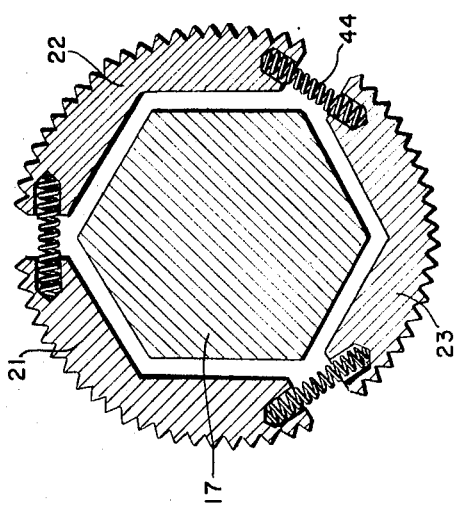
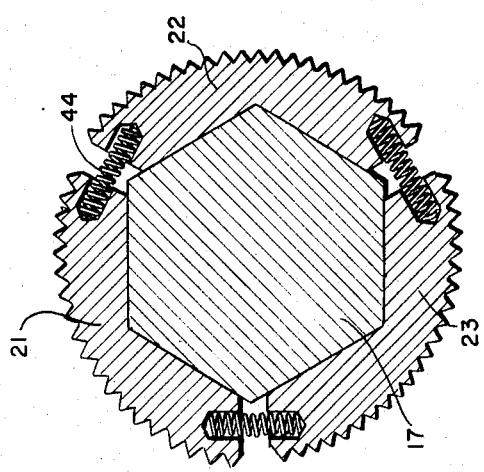

United States Patent Office

3,355,121
Patented Nov. 28, 1967

3,355,121
EXPANSIBLE CHUCK FOR TUBULAR CORE
Leon C. Wright, Hartsville, S.C., assignor to Sonoco
Products Company, Hartsville, S.C., a corporation of
South Carolina
Filed Oct. 13, 1966, Ser. No. 586,430
6 Claims. (Cl. 242—68.2)

ABSTRACT OF THE DISCLOSURE

This invention comprises an expansible chuck which includes a stub shaft having an intermediate portion of polygonal cross-sectional shape which underlies floating segments yieldingly urged radially outward into engagement with annular collars mounted on the shaft. The segments are provided with V-shaped inner surfaces engageable by the apexes on the shaft intermediate portion upon relative movement between the shaft and segments so as to cam the segments radially outward into positive engagement with the inner wall of a tubular core mounted on the chuck.

---

This invention relates to a chuck and more particularly to an expansible chuck for internally gripping a tubular core on a shaft.

In many paper processing operations utilizing apparatus as winders, rewinders, slitters and the like, it has been proposed to provide such stub shafts with expansible chucks which can be expanded into driving engagement with the paper roll inner wall of the core. By way of example, one common type of unwinding operation occurs in the newspaper industry wherein rolls of paper commonly referred to as "newsprint" are supported for unwinding the paper roll core. The inner diameter of the paper core is subject to considerable variation resulting from large manufacturing tolerances, dimensional changes due to humidity, etc. Accordingly, the use of expansible chucks on such stub shafts has been suggested.

At the high speeds at which such rolls of newsprint are unwound, it can be seen that any misalignment between the axis of the paper core and the stub shafts on which it is supported can easily create a highly undesirable imbalance adversely affecting the unwinding operation. Many expansible chucks are presently available which utilize a camming action for driving engagement between the chuck and paper core. However, such present day chucks occasionally produce axial misalignment between the chuck and core with attendant adverse results because of non-uniform movement of the cammed elements. Furthermore, such present day chucks do not always produce uniform engagement between the chuck and core wall with the result that slipping occurs on occasion between the chuck and core. In addition, it is not uncommon for such present day chucks to expand radially outward to such an extent that the core is damaged by breaking down of the core wall particularly in thin wall tubes thereby presenting a serious problem.

Accordingly, a primary object of this invention is to provide a new and novel expansible chuck for a tubular core.

Another object of this invention is to provide a new and novel expansible chuck for a paper core.

Another object of this invention is to provide a new and novel expansible chuck for a paper core which provides uniform driving engagement between the chuck and the core inner wall.

A further object of this invention is to provide a new and novel expansible chuck for a paper core which virtually eliminates all relative motion between the chuck and core and which prevents undesirable damage to the paper core wall during use.

Other objects and advantages of the invention will become apparent from the following description taken in connection with the accompanying drawings.

The objects stated above and other related objects in this invention are accomplished by the provision of an expansible chuck including a shaft having an intermediate portion of polygonal cross-sectional shape having faces over which are positioned in overlying relationship a plurality of floating, circumferentially spaced segments. Each of the segments is provided with a V-shaped inner surface and means are provided for yieldingly urging the segments radially outward into engagement with collar means mounted on the shaft adajcent each end of the shaft intermediate portion. Relative movement between the shaft intermediate portion and segments cams the segments radially outward into positive driving engagement with the inner wall of a tubular core mounted on the chuck.

The novel features which are believed to be characteristic of the invention are set forth with particularity with the appended claims. The invention itself, however, both as to its organiaztion and method of operation may be best understood by reference to the following description taken in conjunction with the accompanying drawings in which:

FIGURE 1 is a sectional view of a paper roll and core together supported at each end on the chuck of the invention;

FIGURE 2 is an enlarged sectional view taken substantially along line 2—2 of FIGURE 1 in the direction of the arrows;

FIGURE 3 is a longitudinal sectional view of the chuck of the invention;

FIGURE 4 is a longitudinal sectional view similar to FIGURE 3 of a modification of the chuck of the invention;

FIGURE 5 is a sectional view of the chuck of the invention showing parts in the innermost position; and FIGURE 6 is a sectional view taken susbtantially along line 6—6 of FIGURE 3 in the direction of the arrows.

As generally illustrative of the invention, there is shown in FIGURE 1 a pair of expansible chucks each constructed in accordance with the invention and each of which have been designated generally by the letter C. The chucks C are arranged to be inserted in the well-known manner into opposite ends of a tubular core 11 such as a paper tube or core having an inner wall 12. In the illustrated embodiment, the paper core 11 has wound thereon windings of sheet maeerial 13 such as paper, film or the like. In the illustrated embodiment, the sheet material 13 may be "newsprint" from which newspapers are printed and the paper roll is designated generally in FIGURE 1 by the numeral 14. The expansible chuck C of the invention may be used for any winding or unwinding operation and in the illustrated embodiment the chucks C are arranged to support the newsprint roll 14 for an unwinding operation during which the newsprint 13 is unwound for the printing of newspapers.

As specifically illustrative of the invention and referring now to FIGURES 1-3, the chuck C includes a shaft 16 which in the specific embodiment illustrated is a shaft of relatively short length or what is generally referred to as a stub shaft. It should be understood that the chuck C of the invention may be of any suitable length throughout a wide range and that the length of the chuck shown in the drawings is representative of the chuck construction for any desired shaft length. For instance, the shaft 16 may be continuous extending completely through the core 11 and supporting both of the chucks C.

The shaft 16 is provided with an intermediate portion 17 of polygonal cross-sectional shape as shown best in FIGURES 2, 5, 6. In the illustrated embodiment, the shaft intermediate portion 17 is of hexagonal cross-sectional shape to provide six faces 18 with adjacent faces intersecting to define an apex 18a.

A plurality of circumferentially spaced segments are provided, preferably three in number identified by the numerals 21, 22 and 23, which are positioned freely in overlying relationship with the shaft intermediate portion 17. Each of the segments 21–23, which are identical in construction, is provided with a V-shaped inner surface 26, 27 and 28 having apexes 26a, 27a and 28a respectively. Each of the inner surfaces 26–28 of the segments 21–23 corresponds to and is arranged in overlying mating relationship with a pair of adjacent faces 18 on the shaft intermediate portion 17 as shown best in FIGURE 5. In the position of the segments 21–23 of FIGURE 5, which is shown for illustrative purposes only, the faces 18 are received within the V-shaped inner surfaces 26–28 on the segments 21–23 with the apexes 18a on the shaft portion 17, and the apexes 26a–28a on the segments 21–23 in nesting engagement.

The segments 21–23 are thus arranged for radial movement and collar means are mounted adjacent each end of the shaft intermediate portion 17 for limiting the radially outward movement of the segments. More specifically, as shown best in FIGURE 3, annular collars 31, 32 having inner bores 33, 34 are secured by suitable means such as set screws 36, 37, respectively, to the shaft 6 adjacent each end of the intermediate portion 17. The collars 31, 32 are provided with inwardly projecting annular flanges 38, 39, respectively, under which opposite ends of the segments 21–23 extend as shown.

Means are provided on the outer surface of the segments 21–23 for frictionally gripping the inner wall 12 of the tubular core 11 when the segments are moved radially outward into driving engagement with the inner wall 12 of the core 11. More specifically, the segments 21–23 are provided with longitudinally extending splines 41–43 respectively which extend radially outward. The splines 41–43 terminate adjacent each end of the segments 21–23 respectively so as to extend between the outer collar flanges 38, 39 in the assembled position with the end portions of the segments extending below the collar flanges 38, 39.

Means are provided for yieldingly urging the segments 21–23 radially outward into engagement with the collar flanges 38, 39 and into uniformly spaced parallel relationship with the shaft intermediate portion 17. More specifically, at least one spring is positioned between each of the adjacent longitudinal side edges of the segments 21–23 and in spreading engagement therewith as shown in FIGURES 3, 6. Preferably, each of the adjacent longitudinal side edges 21a–21b, 22a–22b, and 23a–23b of segments 21–23, respectively, is provided with at least one associated pair of oppositely disposed aligned recesses 46 to accommodate the opposite ends of a spring 44 centrally arranged intermediate the ends of each of the segments 21–23 as shown in FIGURE 3. It should be understood that, if desired, additional springs 44 and recesses 46 may be provided arranged in longitudinally spaced relationship between the adjacent side edges of segments.

As has been previously explained, a pair of expansible chucks C are provided which are suitably arranged to be moved axially in a reciprocating manner so as to be inserted and withdrawn selectively into the opposite ends of the core 11 of a paper roll 14. Prior to insertion of the chunk C into the end of the paper core 11, the segments 21–23 are yieldingly urged radially outward by means of the springs 44 into the position shown in FIGURES 3, 6 with the segments in engagement with the collar flanges 38, 39 to limit further radially outward movement. As a result of the loading action of the springs 44, the segments 21–23 are arranged in uniformly spaced relationship about the shaft intermediate portion 17.

When the chuck C is inserted into the end of the paper core 11, the segments 21–23 move radially inward in a uniform manner into an intermediate position between the position of FIGURES 3, 6 and the fully contracted position of FIGURE 5 which intermediate position is shown in dotted lines in FIGURE 2. The springs 44 force the segments 21–23 against the inner wall 12 of the core 11 wherein positive driving engagement is obtained as a result of the biting or cutting of the splines 41–43 on segments 21–23 respectively into the inner wall 12 of the core.

When the chucks C have been inserted into the position of FIGURE 1 and the unwinding operation is started, the paper roll 14 is rotated in the direction of the arrow I and a restraining force is applied to the shaft 16. As the segments 21–23 move in the same direction as that of the paper roll 14, the shaft intermediate portion 17 occupies the relative position shown in the solid lines in FIGURE 2 in camming engagement with the V-shaped inner surfaces 26–28 on the segments 21–23. The segments 21–23 are therefore cammed radially outward into positive driving engagement with the inner wall 12 of the core 11 but radially inward from the collar flanges 38, 39 whereby the tension on the unwinding paper roll 14 is determined by the restraining force exerted on the shaft 16 in the opposite direction.

FIGURES 4–6 disclose a modification of the expansible chuck of the invention which is suitable for installations where relatively short stub shafts 16 are required but where a maximum length for the segments 21–23 is desired. In the modification of FIGURES 4–6, like numerals have been employed to identify like parts, the modified form being indicated by the letter C'.

As shown in FIGURE 4, the forward collar 49 is secured to the forward end of the stub shaft 16 by means such as one or more machine screws 51 extending parallel to the axis of the shaft 16. The forward collar 49 is provided with an inwardly projecting annular flange 52 which engages the ledge portion of annular flanges 53 projecting radially inward from and suitably secured by welding or the like to each of the segments 21–23. Thus, the outer flange 52 is positioned radially inward of the segments 21–23 so that the outer end of the modified chuck C' is defined by the forward end of the segments 21–23. In the modification of FIGURES 4–6, the parts operate in substantially the same manner as described with respect to the embodiment of FIGURE 2.

It can be seen that there has been provided with the novel construction of this invention an expansible chuck for a tubular core such as a paper or metal tube or core which utilizes freely positioned or floating segments which are cammed into driving engagement with the paper core. An outstanding feature of the invention is the arrangement of the chuck whereby the segments are yieldingly positioned in uniformly spaced relationship with the shaft on which the segments are supported so that insertion of the chuck into the end of the paper core moves all of the segments radially inward uniformly thereby insuring the proper driving engagement and co-axial alignment between the chuck and core. Furthermore, the loading of the segments against the wall of the core by yieldable means such as springs permits immediate engagement between the segments and inner wall of the paper core to thereby eliminate relative movement between the segfents and core prior to the camming action on the segments. Another outstanding feature of the expansible chuck of the invention is the provision of collars which prevent the segments from moving radially outward to such a radial position that slippage of the shaft relative to the segments occurs. In addition, by limiting the maximum radial movement outwardly of the segments, destruction of the wall of the paper core by bursting or the like such as readily occurs with thin wall tubes utilizing present-day expansible chucks is eliminated. Furthermore, although the expansible chuck of the invention is illustrated with the use of a stub shaft, it is similarly adaptable to use with a full length continuous shaft when such is desired.

While there has been described what at present is considered to be the preferred embodiment of the invention, it will be understood by those skilled in the art that various changes and modifications may be made therein without departing from the invention and, therefore, it is the aim of the appended claims to cover all such changes and modifications as fall within the true spirit and scope of the invention.

Having thus described the invention, what is claimed is:

1. A chuck for a tubular core comprising, in combination, a shaft, an intermediate portion of polygonal cross-sectional shape on said shaft, said intermediate portion having adjacent faces intersecting to form an apex, a plurality of circumferentially spaced segments freely positioned in overlying relationship with said shaft intermediate portion, each of said segments having a V-shaped inner surface corresponding to and arranged in overlying mating relationship with a pair of adjacent faces on said shaft intermediate portion, collar means mounted on said shaft adjacent each end of said shaft intermediate portion for limiting radially outward movement of said segments, means for yieldingly urging said segments radially outward into engagement with said collar means and into uniformly spaced parallel relationship with said shaft intermediate portion, said apexes being arranged to engage said V-shaped inner surfaces on said segments upon relative movement between said segments and shaft intermediate portion to cam said segments radially outward into driving engagement with a tubular core mounted on said chuck.

2. A chuck in accordance with claim 1 wherein said shaft intermediate portion is of hexagonal cross-sectional shape and wherein three of said segments are provided.

3. A chuck in accordance with claim 1 wherein said urging means includes a plurality of springs, said springs being positioned between adjacent longitudinal side edges of said segments and in spreading engagement therewith.

4. A chuck in accordance with claim 1 including means on the outer surface of said segments for frictionally gripping the inner wall of said tubular core when said segments are moved into said driving engagement.

5. A chuck in accordance with claim 1 wherein said shaft intermediate portion is of hexagonal cross-sectional shape, and including three circumferentially spaced arcuate segments, each of said segments having a longitudinally fluted outer surface and an arcuate ledge portion adjacent each end, and wherein said collar means include a collar having an annular flange detachably mounted on said shaft adjacent each end of said shaft intermediate portion for limiting radially outward movement of said segments, at least one pair of oppositely disposed, aligned recesses in the longitudinally extending adjacent side edges of said segments, a spring having opposite ends positioned in each of said pairs of recesses for yieldingly urging said segments radially outward with said arcuate ledge portions in engagement with said annular collar flanges and with said segments in uniformly spaced, parallel relationship with said shaft intermediate portion.

6. A chuck in accordance with claim 5 wherein said arcuate ledge portion adjacent one end of said segments extends radially inward and wherein the collar associated with said radially inward projecting arcuate ledge portion is positioned in underlying relationship with said segments one end portion.

References Cited

UNITED STATES PATENTS

| | | | |
|---|---|---|---|
| 999,191 | 7/1911 | Hunter | 242—72 |
| 1,597,568 | 8/1926 | Bandy | 242—68.2 |
| 2,113,701 | 4/1938 | Mayer | 242—68.2 |
| 3,007,652 | 11/1961 | Heckman | 242—72 |

FRANK J. COHEN, *Primary Examiner.*